United States Patent Office 2,860,919
Patented Nov. 18, 1958

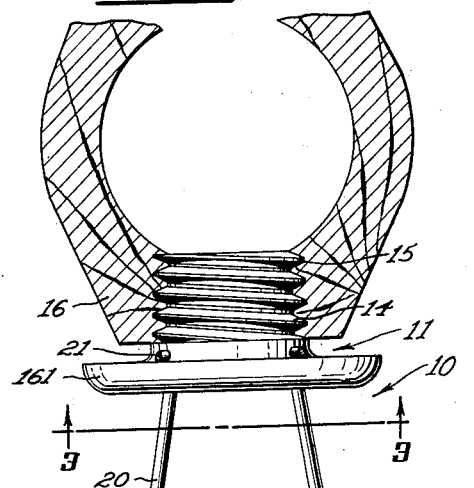
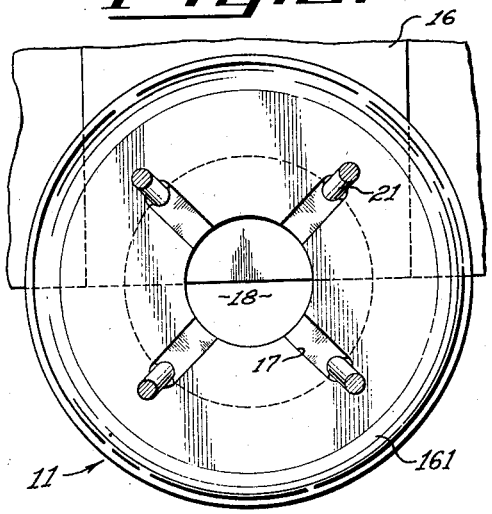
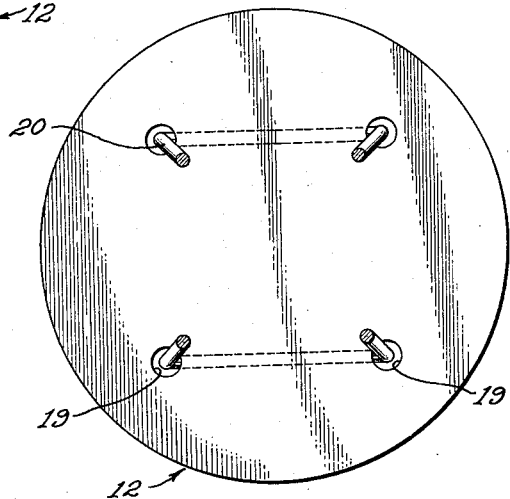
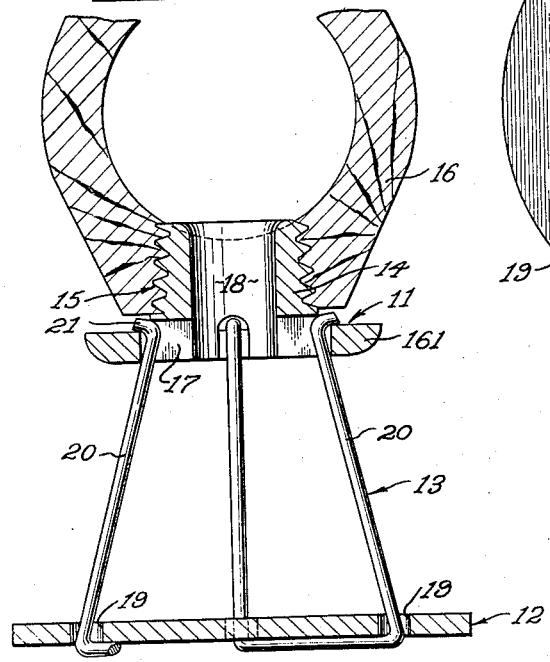

2,860,919
BAFFLED SPRAY NOZZLE

James G. De Flon, Whittier, Calif., assignor to The Fluor Corporation, Ltd., Los Angeles, Calif., a corporation of California Application February 24, 1956, Serial No. 567,637

3 Claims. (Cl. 299—121)

This invention has to do generally with improvements in water spray nozzles of the type usable in atmospheric or mechanical draft water cooling towers to distribute water openly and in divided particle form, over packing, decking or other baffling or filming surfaces to obtain extended surface exposure of the sprayed water to the air currents passing through the tower. More specifically, the invention is directed to a new spray nozzle construction characterized by its practicability in construction and the materials of which it is made, and the capacity of the nozzle to disperse the water in an effective spray pattern.

Structurally the invention may be further characterized as relating to spray nozzles adapted to be attached to a conduit such as a water distributing flume or header, the vertically positioned nozzle assembly comprising an upper nozzle proper and below it a baffle onto which water is discharged from the nozzle to be dispersed outwardly upon impingement upon the baffle, in a wide spray pattern.

The invention has among its principal objects reduction of the nozzle assembly parts to the simple components comprising the nozzle proper, a baffle disc, and a simple arrangement of suspension members removably mounting the baffle on the nozzle. In furtherance of its objects of long and practical serviceability, and desirable low cost for manufacture, the invention contemplates forming the nozzle and baffle of suitable ceramic material, for example essentially of the composition used in ceramic tile, which affords the advantage of permitting the parts to be inexpensively molded and of course to be completely resistant to the kind of corrosion that affects the ordinary metals when used in the presence of water. The baffle supporting or suspension members are made of resilient corrosion resistant metal, preferably of heavy gauge stainless steel wire, the latter being removably inserted through openings in the baffle and removably retained, by virtue of the resilient flexibility of the wire, by the nozzle proper, so that all the parts are simply related for ease of assembly and disassembly.

All the features of the invention as well as the details of a typical and illustrative embodiment, will be more fully understood from the following detailed description of the accompanying drawing, in which:

Fig. 1 is a view showing the nozzle assembly in elevation;

Fig. 2 is a view showing the assembly in vertical section;

Fig. 3 is an enlarged bottom plane taken on line 3—3 of Fig. 1; and

Fig. 4 is a plane as viewed from line 4—4 of Fig. 1.

The nozzle assembly, generally indicated at 10, is shown to comprise the nozzle proper 11, the spaced baffle disc 12 below, and the suspension members 13.

Referring first to the nozzle 11, the latter is shown to be of tubular form with its body 14 externally threaded at 15 to be screwed into a wooden water conduit 16. The bottom portion of the nozzle is annularly flanged at 161 and contains four recesses or slots 17 opening radially outward from the nozzle bore 18 through the flange at its juncture with the body 14. As mentioned, this nozzle preferably is made of cast or molded ceramic composition.

The baffle disc 12, preferably in circular form, also is made of ceramic material and contains openings 19 through which the suspension members extend.

The baffle disc is suspended by two generally U-shaped stainless steel heavy gauge wire members 20, the arms of which are inserted upwardly through the openings 19 and have their ends turned outwardly at 21 for reception within the outer open ends of the slots 17 so that the ends 21 overlie and are supported on the top surface of the flange 161. Thus to assemble the device, it is only necessary to insert the wire members 20 through the baffle disc and constrict the upper ends 21 by flexure of the wires sufficiently to allow the turned ends to enter and expand out into the nozzle openings.

As will be apparent from what has been described, water discharged from the nozzle bore 18 impinges against the top surface of the baffle disc and is dispersed radially outward in a pattern the extent of which may be varied in accordance with such considerations as the relation between the disc diameter, the size of the nozzle bore 18 and the spacing between the nozzle and disc.

I claim:

1. The combination comprising an open tubular externally threaded ceramic nozzle adapted to be screwed in vertical axial position with a water conduit, a ceramic baffle spaced below and in vertical alinement with the nozzle, and a pair of U-shaped resiliently flexed metal members extending downwardly and outwardly from inside the nozzle through openings in said baffle and thence beneath the baffle, said members having turned free upper ends received within recesses in the nozzle and removable therefrom by inward flexure of the members, said nozzle holding said members in flexed condition.

2. The combination defined by claim 1, in which said baffle is in the form of a substantially flat circular disc.

3. The invention as defined in claim 1 in which said nozzle includes a flange below the thread level, and in which said member upper turned ends are supported on the top surface of the flange.

References Cited in the file of this patent

UNITED STATES PATENTS

| | | |
|---|---|---|
| 381,340 | Cottle | Apr. 17, 1888 |
| 890,044 | Godbey | June 9, 1908 |
| 1,401,176 | Miller et al. | Dec. 27, 1921 |
| 2,502,754 | Rowley | Apr. 4, 1950 |
| 2,701,165 | Bete et al. | Feb. 1, 1955 |
| 2,727,126 | Guest et al. | Dec. 13, 1955 |

FOREIGN PATENTS

| 19 | Great Britain | 1912 |